United States Patent [19]

Ström

[11] 4,093,121
[45] June 6, 1978

[54] NOZZLE

[75] Inventor: Torsten Erik Theodor Ström, Fristad, Sweden

[73] Assignee: N. Lundbergs Fabriks AB, Fristad, Sweden

[21] Appl. No.: 742,613

[22] Filed: Nov. 17, 1976

[30] Foreign Application Priority Data

Nov. 18, 1975  Sweden .............................. 7512927

[51] Int. Cl.² ............................................. B05B 15/02
[52] U.S. Cl. ..................................... 239/117; 239/414; 239/417.5
[58] Field of Search ............ 239/112, 113, 117, 417.5, 239/422, 423, 428, 416.1, 434, 414

[56] References Cited

U.S. PATENT DOCUMENTS

| 554,436 | 2/1896 | Booth ................................ 239/434 |
| 1,432,071 | 10/1922 | Lockett .............................. 239/113 |
| 1,437,331 | 11/1922 | Alexander ....................... 239/434 X |
| 2,356,865 | 8/1944 | Mason ............................. 239/428 X |
| 3,945,569 | 3/1976 | Sperry .............................. 239/112 |

Primary Examiner—John J. Love
Attorney, Agent, or Firm—Finnegan, Henderson, Farabow & Garrett

[57] ABSTRACT

A nozzle comprises three tubes enclosed by a casing and forming a longitudinally extending partition therein, one tube forming a central passage through the casing and communicating near the mouth of the nozzle with each of the other two tubes.

4 Claims, 4 Drawing Figures

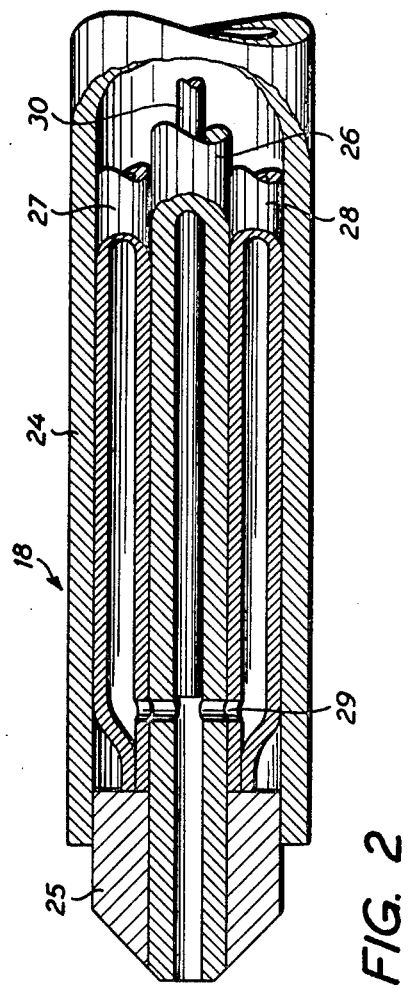
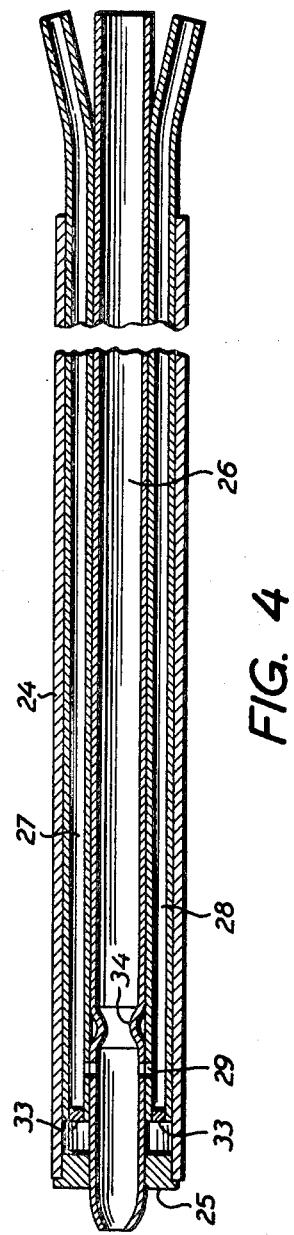
FIG. 2
FIG. 4

NOZZLE

The present invention relates to a nozzle for the supply of two components for the production of an expanded plastic layer in a cavity defined by a surrounding wall which is being advanced continuously.

In such extrusion it is essential for obtaining a good result and a good quality of the expanded plastic layer that the components which shall form the expanded plastic layer, for example base material and foaming agent, are supplied at the correct position in the cavity especially in case the expanded plastic layer is being formed at the same time as the wall is being extruded. In that case the prevailing temperature conditions must be considered, the temperature as a rule being too high for the expansion of the plastic material immediately at the position where the wall comes out from the extruder head. Thus it will be necessary to supply the expanded plastic components in the cavity at a substantial distance from the extruder head. Another problem as far as nozzles of the kind referred to herein is concerned is that the total outer diameter of the nozzle often must be made rather small in order to allow the nozzle to be introduced into the cavity, and this problem is stressed particularly where the wall is being extruded around the expanded plastic layer at the same time as this is being produced, due to the fact that the space in the extruder head, usually a cross head, is extremely limited. Moreover, it is necessary that the nozzle can be cleaned of plastic material which could block the opening thereof in case a brake is made in the production of the expanded plastic layer, which is otherwise kept going continuously, without extensive demounting work being associated therewith. In other words, it is desirable, not to say necessary, that cleaning of the nozzle can be performed from the outside of the cavity. Such means as are required therefor involve an increase of the dimensions of the nozzle, especially the diameter thereof, which unfavourable.

It is a primary object of the invention to provide a new and improved nozzle of the kind referred to initially which can be made with a great length and a small cross dimension without requiring precision machining to close tolerances and, above all, without the necessity of drilling passages in the nozzle. Machining by drilling involves a highly limiting factor with regard to the length of the nozzle due to the fact that it is not possible to drill long passages having a small diameter, It is a further object of this invention to provide a new and improved nozzle wherein the components of the expanded plastic material can be ejected and mixed with each other by means of an air or other gas stream supplied through the nozzle.

A still further object of the invention is to provide a new and improved nozzle wherein simple means are provided for closing off the supply of the components of the expanded plastic material when desired.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, there is provided according to the invention a nozzle of the kind referred to above, comprising an outer casing closed at both ends, a central nozzle tube arranged coaxially in said casing, which is open at one end of the casing to form the mouth opening of the nozzle, and two supply tubes arranged at diametrically opposed sides of the central tube, which form together with the central tube a partition extending axially through the casing and communicates with the central tube near the mouth end thereof said supply tubes being extended at the other end of the casing to be connected to means for supplying the respective components.

The accompanying drawings, which are incorporated in and constitute a part of this specification, illustrate embodiments of the invention and, together with the description, serve to explain the principles of the invention.

Of the drawings

FIG. 2 is an enlarged axial sectional view of the mouth portion of the nozzle;

FIG. 3 is a cross sectional view, also enlarged, of the nozzle; and

FIG. 4 is an axial sectional view of another embodiment of the nozzle according to the invention.

Figure 1:
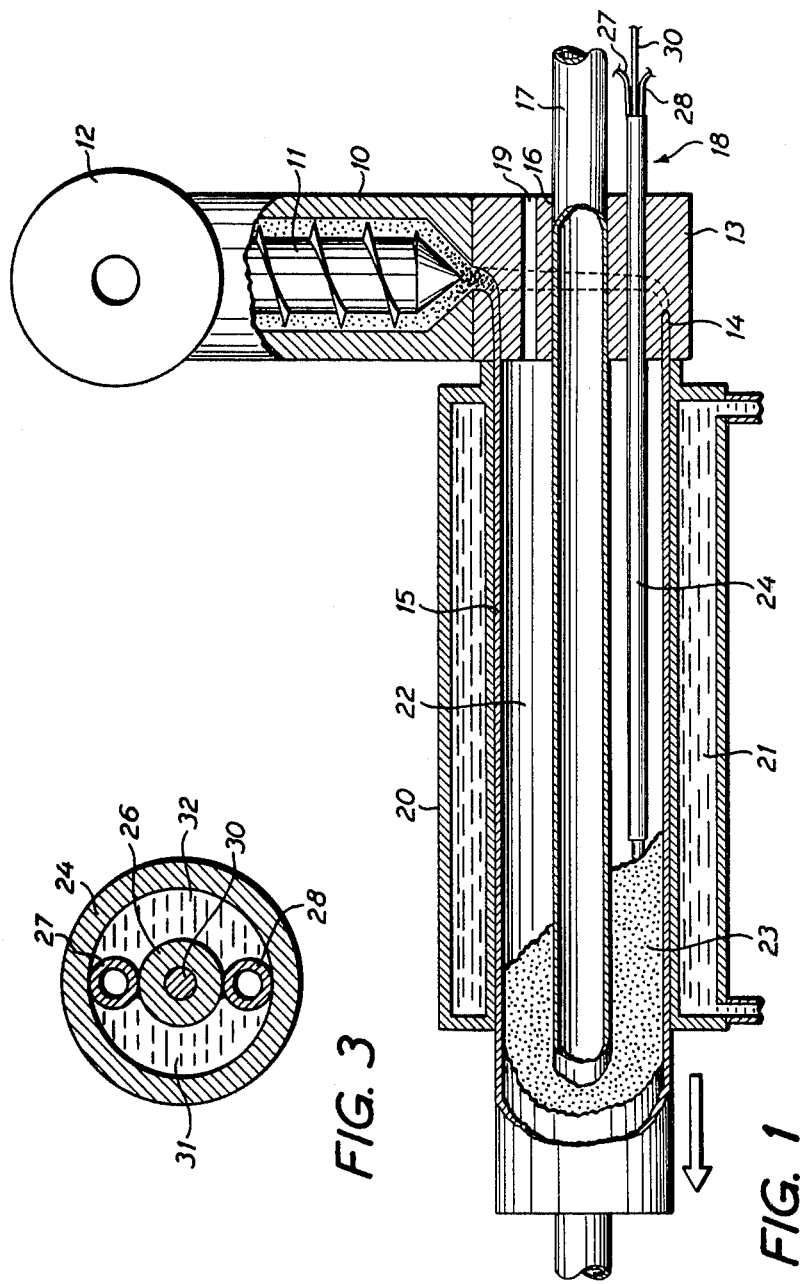
FIG. 1 is an axial sectional view of a cross head for the application of a layer of expanded plastic material around a tube, a sheath being extruded simultaneously around the expanded plastic layer.

Reference will now be made in detail to the present preferred embodiments of the invention, examples of which are illustrated in the accompanying drawings.

In FIG. 1 there is disclosed an extrusion cylinder 10 of an extruder, having a screw 11 and a supply hopper 12. To the extrusion cylinder there is connected a cross head 13 having a circular die 14 for the extrusion of a cylindrical tube 15 of thermoplastic such as polyethylene; in the following this tube will be called a sheath. In the cross head there is arranged centrally of the die a central passage 16 for the introduction of a line tube 17 of copper, plastic or other suitable material, and a nozzle 18 for the supply of the two components included into an expanded plastic material of the two component type, such as cellular or porous plastic material, for example polyurethane foam. These components can comprise a base material and a foaming agent. There is also provided in the cross head a passage 19 for venting the annular cavity formed between the sheath and the line tube.

A calibrator 20 having water cooling means 21 is connected directly to die 14 in order to support sheath 15 which is still soft, against internal pressure. The calibrator is stationary, and the outer surface of sheath 15 slides against the forming and supporting inside surface of the calibrator when the sheath comes out from the die.

Conduit tube 17 is being advanced axially through passage 16 in cross head 13 coaxially into the extruded sheath 15 at the same speed as that at which the sheath is being extruded. The line tube can be advanced in a conventional manner by means of rollers, not shown here, which engage frictionally the tube. When sheath 15 is being extruded continuously from die 14 line tube 17 being introduced continuously into the die at the same speed as that at which the sheath is being advanced, the two cellular plastic components are supplied to the annular cavity 22 between tube and sheath through nozzle 18 said components being brought to form a rigid expanded plastic layer 23 around line tube 17, the quantity of plastic material supplied per time unit being adjusted such that this layer fills completely cavity 22. The pressure exerted by the expanding plastic on the surrounding sheath 15 still being soft, is taken up by calibrator 20, and gases formed during the expansion will escape or will be disharged through venting passage 19.

As the temperature of cross head 13 can be of the order of 200° C while the expansion temperature often is considerably lower and may be of the order of 60° C it is necessary to supply the plastic components at a position in the annular cavity 22 where the temperature is favourable to the expansion. Nozzle 18 inserted through the cross head therefore has a relatively great length as will be seen from FIG. 1 and moreover must have a relatively small cross dimension in order to be drawn through the cross head into cavity 23 without the necessity of a radical reconstruction of the cross head and rearrangement of the passages provided therein for the plastic material of the sheath. According to the invention the nozzle is composed of several elements which are available on the market as standard elements, namely tube and rod material. Furthermore, the nozzle is constructed in such a way that it can be cooled over the entire length thereof so that the plastic components can be held at a suitable temperature, the nozzle moreover being provided with a cleaning pin.

With reference to FIGS. 2 and 3 of the drawings the nozzle comprises an outer casing 24 of cold-drawn acid-proof steel tubing which is provided with a plug 25 at one end thereof, namely the mouth end of the nozzle, sealingly connected therewith. This plug is penetrated by a central tube 26, also a cold-drawn acid-proof steel tube, which opens at the end of the plug 25 and extends continuously through the entire nozzle to the other end thereof which is disposed outside cross head 13. At diametrically opposed sides of this central tube 26 there are provided two cold-drawn acid-proof steel tubes 27 and 28 which are welded or cemented along the central tube 26, the unit formed by the three tubes 26, 27, 28 having a cross dimension which substantially equals the inside diameter of the outer casing 24 with such tolerances that the tube aggregate can be pushed or driven into the outer casing. Close to the plug 25 the two tubes 27 and 28 are closed completely by being flattened and near the plug 25 they communicate through a cross bore 29 with the passage through the central tube 26. For the drilling of this cross bore there can be drilled in tube 27 or 28 a bore which is then plugged. Tubes 27 and 28 are extended from the nozzle at the outer end thereof and are connected to supply means for the two components to be included in the expanded plastic material. In the passage of tube 26 there is provided a drawn, ground and polished steel rod 30 which is axially displaceable in tube 26 from the position disclosed in FIG. 2 in which cross bore 29 is exposed so that there is a free connection between tubes 27 and 28, respectively, and the passage through tube 26, and an advanced position in which the end of rod 30 is disposed at the very mouth of the nozzle or even somewhat beyond the mouth. In said latter position the communication between tubes 27 and 28 on one hand and tube 26 on the other hand is interrupted by means of the rod which thus serves both as a cleaning pin and as a valve member.

The aggregate composed by tubes 26, 27 and 28 forms a partition in casing 24 and divides the interior thereof into two halves which are interconnected at plug 25 only. To one of the two spaces thus formed in the casing, designated 31 and 32 in FIG. 3, which extend over the entire axial length of the nozzle there can be supplied a cooling medium such as cooling water from the outer end of the nozzle such cooling medium flowing along the nozzle to the inner end thereof where it passes, close to the plug 25, to the other space in order to flow back through this space to the outer end of the nozzle and then be discharged, possibly for recirculation through a cooler. In some cases there may be used a heating medium depending on the expanded plastic material which is being used and the conditions prevailing for the rest.

In a typical embodiment of the nozzle according to the invention, tube 24 can have an outer diameter of 9 millimeter and a wall thickness of 1 millimeter while the corresponding dimensions of tube 26 and 3 millimeter and 1 millimeter, respectively, and of tubes 27 and 28 are 2 millimeter and 0.5 millimeter, respectively. The length of the nozzle may be of the order of 1 meter.

The nozzle described can be modified as far as the constructive embodiment is concerned without departing from the inventive concept. Thus, the termination of tubes 27 and 28 can, of course, be arranged in another manner than that disclosed here close to plug 25 and it is, or course, also possible to arrange cleaning pin 30 in another manner than that shown in order to combine the cleaning and valve functions, or the cleaning pin may be excluded completely. One embodiment where this is done is disclosed in FIG. 4.

The nozzle in FIG. 4 comprises in the same manner as the nozzle described above an outer casing 24 formed by a cylindrical tube, and a partition arranged therein which comprises a central tube 26 and two tubes 27 and 28 disposed at diametrically opposed sides of said central tube. The material of the casing and of the three tubes can be a cold-drawn acid-proof steel as mentioned earlier. The central tube is in communication with tubes 27 and 28 through a cross bore 29 and is extended through a plug 25 secured to casing 24, in order to form the mouth end of the nozzle outside plug 25. Tubes 27 and 28 terminate at some distance from plug 25 and are closed off at their ends by means of plugs 33 secured therein. The two spaces in casing 24 on opposite sides of the partition formed by tubes 26, 27 and 28 communicate with each other between plug 25 and the ends of tubes 27 and 28 closed by means of plugs 33, in the manner explained in connection with the embodiment previously described.

Just behind bore 29, that is before the bore as seen in the intended direction of flow, an external annular groove in tube 26 forms an internal restriction 34 of venturi type in the passage through tube 26. It is the intention that this nozzle shall operate with pressurized air (or other pressurized gas) supplied through tube 26 said air after having passed restriction 34 carries with it the components of the expanded plastic, supplied through tubes 27 and 28 and entering the passage of tube 26 through bore 29, and discharges aid components through the mouth end of the nozzle. The pressurized air effectively contributes to the expansion of the plastic material and no cleaning or closing of the nozzle is necessary in this case. When the nozzle is to be made inoperative this can be done in this embodiment (as in the embodiment previously described) by connecting tubes 27 and 28 to a conduit for the supply of washing liquid such as acetone the nozzle being cleaned by blowing while the acetone is flowing through tubes 27 and 28 and through the mouth portion of tube 26.

The pressurized air should be supplied at a pressure which is lower than the pressure at which the components of the expanded plastic is supplied through tubes 27 and 28 in order to avoid the pressurized air passing into these two tubes.

In a tube 26 having an inner diameter of 2.2 millimeter, the restriction can be for example 1.5 millimeter in diameter, that is slightly more than two-thirds of the inside diameter of tube 26.

The external groove at restriction 34 provides a limited communication between the spaces in casing 24 on both sides of the partition but the major part of circulating cooling or heating medium passes through the space between plug 25 and the ends of tubes 27 and 28.

It will be apparent to those skilled in the art that various other modifications and variations in addition to those mentioned above could be made in the nozzle of the invention without departing from the scope and spirit of the invention.

I claim:

1. A nozzle for supplying two components for the production of an expanded plastic layer in a cavity defined by a surrounding wall which is being advanced continuously, comprising an outer casing closed at one end, a central nozzle tube arranged coaxially in said casing and extending through the closed end of the casing to form the mouth opening of the nozzle, two supply tubes arranged along diametrically opposed sides of the central tube, which form together with the central tube a partition extending across and longitudinally along the length of the casing, said supply tubes communicating with the central tube near the mouth end thereof, and means for connecting said supply tubes to a supply of their respective components.

2. The nozzle of claim 1, in which the spaces on opposite sides of the partition communicate with each other near the closed end of the casing.

3. The nozzle of claim 1, including a restriction in the central tube inwardly of the position where the two supply tubes communicate with the central tube, said central tube forming a passage for the supply of pressurized gas through the nozzle opening, and means for connecting said central tube to a supply of pressurized gas.

4. The nozzle of claim 1, including a pin located in the central tube, which is displaceable axially between a first position in which it blocks the communication between the two supply tubes and the central tube, and another position in which it opens the communication between the two supply tubes and the central tube.

* * * * *